US009023929B2

(12) United States Patent
Aarts et al.

(10) Patent No.: US 9,023,929 B2
(45) Date of Patent: May 5, 2015

(54) TACKIFIER DISPERSION

(75) Inventors: Patrick Peter Mario Aarts, Elsloo (NL); Lodewijk Johannes Hubertus Houben, Eijsden (NL); John Hazen, Spaubeek (NL)

(73) Assignee: Lawter, Inc., Chicago, IL (US)

( * ) Notice: Subject to any disclaimer, the term of this patent is extended or adjusted under 35 U.S.C. 154(b) by 921 days.

(21) Appl. No.: 11/053,682

(22) Filed: Feb. 9, 2005

(65) Prior Publication Data

US 2005/0203228 A1   Sep. 15, 2005

Related U.S. Application Data

(60) Provisional application No. 60/543,913, filed on Feb. 13, 2004.

(51) Int. Cl.
*C08K 5/10* (2006.01)
*B01F 17/36* (2006.01)

(52) U.S. Cl.
CPC ........................... *C08K 5/10* (2013.01)

(58) Field of Classification Search
CPC ............ C08K 5/09; C08K 5/10; C08K 5/103; C08K 67/025; C08K 67/08
USPC ........... 524/77, 270, 306, 881, 501, 539, 601, 524/604, 878; 530/216
See application file for complete search history.

(56) References Cited

U.S. PATENT DOCUMENTS

| | | | |
|---|---|---|---|
| 4,477,613 A * | 10/1984 | Evans et al. ................. | 524/77 |
| 4,670,504 A * | 6/1987 | Cardenas et al. ............ | 524/504 |
| 5,030,388 A * | 7/1991 | Martino et al. ............. | 560/127 |
| 5,552,519 A | 9/1996 | Hemmings et al. | |
| 6,274,657 B1 * | 8/2001 | Geoghegan et al. .......... | 524/270 |
| 6,464,764 B1 | 10/2002 | Lichtenberg et al. | |
| 2001/0021737 A1 * | 9/2001 | Hazen et al. ................. | 524/300 |
| 2003/0092829 A1 | 5/2003 | Klauck et al. | |
| 2003/0212201 A1 * | 11/2003 | Hazen et al. ................. | 524/845 |
| 2004/0158003 A1 | 8/2004 | Ruckel et al. | |
| 2004/0171727 A1 * | 9/2004 | Winters et al. .............. | 524/270 |

FOREIGN PATENT DOCUMENTS

| | | |
|---|---|---|
| EP | 0258753 A2 | 9/1988 |
| EP | 1172395 A1 | 1/2002 |
| GB | 785474 | 10/1957 |
| GB | 1600933 | 10/1981 |
| GB | 2137212 A | 10/1984 |
| SU | 1098930 A | 6/1948 |
| SU | 1098930 A | 6/1984 |
| WO | WO 94/18260 | 8/1994 |
| WO | WO 94/24221 | 10/1994 |
| WO | WO 99/39886 | 8/1999 |

* cited by examiner

*Primary Examiner* — Michael Pepitone
(74) *Attorney, Agent, or Firm* — Foley & Lardner, LLP

(57) ABSTRACT

The invention relates to a tackifier dispersion comprising a resinous material and an emulsifier, the emulsifier being obtainable by a method comprising providing an ester of one or more fatty acids containing at least two conjugated double bonds, reacting the ester with a dienophile containing an acid or anhydride group, to form an intermediate product A, and, reacting the intermediate product A with one or more polyalkylene glycols. The invention also relates to a method for the production of a tackifier dispersion, its use as a tackifier, and an adhesive composition comprising the tackifier dispersion. The invention further relates to an emulsifier, a method of producing the same and its use for emulsifying resinous materials.

43 Claims, No Drawings

TACKIFIER DISPERSION

This application claims priority from U.S. Provisional Application No. 60/543,913, filed on Feb. 13, 2004.

The present invention relates to a tackifier dispersion comprising an emulsifier, a process for the production of the same, its use as a tackifier, and an adhesive composition comprising the tackifier dispersion. The invention also relates to an emulsifier, a method of producing the same and its use for emulsifying resinous materials.

BACKGROUND

Many types of adhesive formulations, especially pressure sensitive adhesives based on synthetic polymers, such as acrylic polymers and styrenic block-copolymers, usually need some kind of tackifier in the formulation. The tackifier improves the adhesive properties such as tackiness, peel-resistance and ease of surface wetting. The tack of an adhesive enables it to form an immediate bond between contacted surfaces when they are brought together.

Tackifiers are generally based on resins, tackifier resins, which can be considered as high viscosity solvents for a base polymer in a formulation. A tackifier should be seen as a material which relates to a specific material or group of materials that it tackifies.

Various resinous materials have been suggested as tackifier resins for synthetic polymers. Examples of materials suggested include rosin, disproportionated rosin, rosin esters such as glycerol esters of rosin and pentaerythritol esters of rosin, aliphatic hydrocarbon resins, aromatic petroleum resins, DCPD resins, terpene resins, terpene/phenol resins and cumarone/indene resins.

Tackifier resins for pressure sensitive adhesives are usually based on rosin and/or derivatives thereof or hydrocarbon resins. Rosin is a natural resinous product mainly consisting of rosin acids. Typical rosin acids are, for example, abietic acid and levopimaric acid. The difference between the rosin acids is mainly the number and position of the double bonds. Rosin may be classified due to the species of the tree from which it originates such as Chinese, Indonesian, and Brazilian rosin and/or to the production process from which it originates such as gum rosin, wood rosin or tall oil rosin.

Hydrocarbon resins are generally low-molecular weight aliphatic or aromatic polymers typically having a weight average molecular weight of 500-3000. Common aliphatic hydrocarbon resins are resins derived from so called $C_5$ feed streams and common aromatic hydrocarbon resins are derived from $C_9$ feed streams. These feed streams originate from the oil cracking industry.

In aqueous adhesive compositions it is common to include the tackifier resin in the form of an aqueous dispersion. In order to make a dispersion from a resinous material such as rosin or hydrocarbon resin, a surfactant is needed acting as an emulsifier. In the case of rosin and hydrocarbon resins, the aqueous dispersion is usually made by first melting the rosin or hydrocarbon resin and then adding a surfactant and water to form a dispersion in which the rosin/resin is the dispersed phase and water the continuous phase.

Many different surfactants are known in the art such as alkyl sulphonates, fatty alcohol sulphates, and phosphate esters. However, the use of these types of surfactants may result in an adhesive, when dried, being hygroscopic which may result in an unwanted whitening of the adhesive film. Also, the cohesive strength of an adhesive bond and mechanical stability of the tackifier resin dispersion can be quite low.

U.S. Pat. No. 5,552,519 discloses a surfactant derived from a rosin ester.

US 2003/0092829 discloses a binder based on a reaction product of soybean oil, maleic anhydride and a polyethylene glycol of low molecular weight.

U.S. Pat. No. 6,464,764. discloses a wood protective agent comprising binder made from e.g. linseed oil and small amounts of maleic acid and polyethylene glycol.

WO 94/18260 discloses a water soluble and air-drying resin having an iodine value of between 50 and 150. The resin comprises substantially units of: A. a monoether of a polyethylene glycol having 5-100 ethylene oxide units per molecule, and B. the reaction product of: B1) one or more unsaturated fatty acids or one or more polyalcohol(s) esterified with unsaturated fatty acids with B2) an alpha, beta-ethylenically unsaturated carboxyl compound wherein the molar ratio of A:B is from about 0.2:1 to about 4:1.

GB 785474 discloses a process for the production of condensation products, comprising condensing a polyalkylene oxide or a derivative thereof, which oxide or derivative possesses in addition to a lipophilic group at least one free hydroxyl group and has a molecular weight of at least 1000, at an elevated temperature with a polybasic carboxylic acid which contains at least three carboxyl groups and at least one lipophilic group.

US 2004/0158003 discloses a process for preparing a surfactant comprising: reacting an α,β-unsaturated carboxylic acid or anhydride, or an ester thereof, with a resin comprising hydrocarbon monomeric residues, to provide an adduct; and reacting the adduct with either alkylen oxide or a carboxyl-reactive poly (alkylen oxide) to provide the surfactant.

Important properties for a tackifier dispersion are its foam behaviour, solids content/viscosity balance, mechanical stability, wetting properties, and shelf life.

Smaller rosin/resin particles in the tackifier dispersion will, generally, give better stability which means longer shelf life.

Thus, there is still a need for a tackifier dispersion which gives an improved water-resistance of a dried adhesive when used in adhesive compositions compared to traditional surfactants. There is also a need of providing a tackifier dispersion fulfilling the requirements listed above.

It is accordingly an object of the present invention to provide a tackifier dispersion with high storage stability, good mechanical stability and low foaming characteristics, and which only gives low loss in cohesive strength when formulated into adhesive compositions. It is a further object of the present invention to provide an emulsifier that can be produced in a process only requiring few steps.

THE INVENTION

The objects of the present invention are achieved by a tackifier dispersion comprising a certain emulsifier. The invention also relates to a process for the production of a tackifier dispersion, a method of producing an emulsifier, an emulsifier, use of the emulsifier, use of the tackifier dispersion, and an adhesive composition comprising the tackifier dispersion. It has surprisingly been found that tackifier dispersions comprising the emulsifier give very small particle sizes of dispersed resinous material and can be made with high solids contents. Also, tackifier dispersions comprising the emulsifier have excellent storage stability and mechanical stability. Furthermore, adhesive compositions comprising the tackifier dispersion have high water resistance, excellent cohesion, high adhesion, and good wetting properties.

One aspect of the invention concerns a process for the production of a tackifier dispersion comprising dispersing a resinous material in an aqueous phase in the presence of an emulsifier, the emulsifier being obtainable by a method comprising providing an ester of one or more fatty acids containing at least two conjugated double bonds, reacting the ester with a dienophile containing an acid or anhydride group, to form an intermediate product A, and, reacting the intermediate product A with one or more polyalkylene glycols.

A further aspect of the invention concerns a tackifier dispersion comprising a resinous material and an emulsifier, the emulsifier is being obtainable by a method as defined above. The emulsifier can thus be a reaction product of one or more polyalkylene glycols with an intermediate product A formed by a reaction between an ester of one or more fatty acids containing at least two conjugated double bonds with a dienophile containing an acid or anhydride group.

Still a further aspect of the invention concerns the use of an emulsifier as defined above for dispersing a resinous material.

Another aspect of the invention concerns a process for the production of an emulsifier comprising providing an ester of one or more fatty acids containing at least two conjugated double bonds, reacting the ester with a dienophile containing an acid or anhydride group, to form an intermediate product A, and, reacting the intermediate product A with one or more polyalkylene glycols having an average molecular weight, determined by hydroxyl number analysis, of more than 650.

Still another aspect of the invention concerns an emulsifier obtainable by the process as described above. The emulsifier can thus be a reaction product of one or more polyalkylene glycols having a number average molecular weight of more than 650 with an intermediate product A formed by a reaction between an ester of one or more fatty acids containing at least two conjugated double bonds with a dienophile containing an acid or anhydride group.

The ester of one or more fatty acids suitably has an iodine number of more than about 60, preferably more than about 100, most preferably more than about 140 g iodine per 100 g of ester. The ester is suitably an ester of one or more fatty acids and an alcohol. The alcohol is suitably a $C_1$-$C_{10}$ mono-, di- or triol or a higher polyol, preferably a $C_1$-$C_6$ mono-, di- or triol, more preferably a glycerol or ethylene glycol, most preferably glycerol. The ester is preferably a glycol mono- or diester of one or more fatty acids or a mono-, di- or a triglyceride of one or more fatty acids, most preferably a triglyceride of one or more fatty acids. Suitable glycol mono- or diesters of one or more fatty acids include any which contains two conjugated double bonds such as ethylene glycol linolenate and ethylene glycol linolate. Suitable triglycerides of one or more fatty acids include vegetable oils and some animal oils of which, for example, can be mentioned sardine oil, linseed oil, tung oil, walnut oil, soybean oil, safflower oil, sunflower oil, sesame oil, cottonseed oil, corn oil, rapeseed oil, peanut oil, crambe oil, castor oil, olive oil, canola oil, grapeseed oil, and sesame oil, preferably used are sardine oil, linseed oil, tung oil, walnut oil, soybean oil, safflower oil, and sunflower oil. Preferably, the triglyceride is selected from the group of linseed oil, soybean oil, and sunflower oil.

It is to be understood that the esters of one or more fatty acids referred to herein do not include esters that might have been formed from impurities of fatty acids in rosin when making rosin esters.

Suitable dienophiles containing an acid or anhydride group include alpha-beta ethylenically unsaturated carboxylic acids and anhydrides thereof which may be selected from mono-, di- and polybasic ethylenically unsaturated carboxylic acids and anhydrides thereof as well as mixtures of two or more ethylenically unsaturated carboxylic acids or anhydrides. The ethylenically unsaturated carboxylic acid is suitably an alpha-beta unsaturated $C_3$-$C_4$- mono- or dicarboxylic acid and may be selected from acrylic acid, crotonic acid, sorbic acid, maleic acid, methylmaleic acid, ethylmaleic acid, propylmaleic acid, butylmaleic acid, fumaric acid, and structurally similar ones, and also anhydrides thereof. Suitably, the ethylenically unsaturated carboxylic acids are dibasic acids or anhydrides thereof, preferably maleic acid, maleic anhydride, and fumaric acid, most preferably maleic anhydride.

The one or more polyalkylene glycols suitably belong to the group of $C_2$-$C_5$ polyalkylene glycols, such as polyethylene glycol and polypropylene glycol. End-capped polyalkylene glycols such as $C_2$-$C_5$ polyalkylene glycol mono alkyl ethers, wherein alkyl suitably is $C_1$-$C_5$ alkyl, preferably $C_1$-$C_4$ alkyl such as methoxy polyethylene glycol and butoxy polyethylene glycol, are particularly preferred. Most preferably, at least one of the one or more polyalkylene glycols is polyethylene glycol. The average molecular weight of the polyalkylene glycol, determined by hydroxyl number analysis, is suitably from about 500 to about 12000 and preferably more than 650. Preferably the molecular weight is from about 1000 to about 8000, most preferably from about 1500 to about 5000. It is also suitable to use a mixture of one polyalkylene glycol of higher molecular weight with another with a lower molecular weight. In such cases the one or more polyalkylene glycols are may be a mixture of a polyalkylene glycol having an average molecular weight, determined by hydroxyl number analysis, of suitably from about 500 to about 2500, preferably from about 1000 to about 2000, with a polyalkylene glycol having an average molecular weight of suitably from about 3000 to about 5000, preferably from about 3500 to about 4500.

The weight ratio of the ester of one or more fatty acids to the dienophile is suitably from about 0.5:1 to about 20:1, preferably from about 1:1 to about 10:1, more preferably from about 1:1 to about 8:1, most preferably from about 4:1 to about 8:1.

The reaction of the ester of one or more fatty acids with the dienophile suitably forms a Diels-Alder adduct from an unsaturation in the dienophile and the conjugated double bonds in the fatty acid part of the ester and thus introduces one or more acid and/or anhydride groups therein. The resulting intermediate product A preferably has an iodine number from about 0 to about 100, more preferably from about 10 to about 80, most preferably from about 10 to about 70 g iodine per 100 g of A.

The reaction of the ester of one or more fatty acids with the dienophile suitably takes place in a reaction mixture at a temperature of from about 160 to about 260° C., preferably from about 180 to about 230° C., most preferably from about 190 to about 220° C.

The one or more acid and/or anhydride groups in intermediate product A introduced by the Diels-Alder reaction constitute grafts for further reaction with the hydroxyl group in the one or more polyalkylene glycols. The weight ratio intermediate product A to total amount of the one or more polyalkylene glycols, is suitably from about 0.05:1 to about 5:1, preferably from about 0.08:1 to about 1:1, more preferably from about 0.1:1 to about 0.5:1, most preferably from about 0.1:1 to about 0.4:1. The resulting emulsifier preferably has an iodine number from about 0 to about 20, more preferably from about 2 to about 17, most preferably from about 5 to about 15 g iodine per 100 g of product. The number average molecular weight of the emulsifier is preferably from about 2000 to about 19000, more preferably from about 4000 to about 12000, most preferably from about 6000 to about 7000. In one embodiment the emulsifier is a mixture of at least one component having a molecular weight from about 7000 to 11000, at least one component having a molecular weight from about 3000 to about 6500 and at least one component having a molecular weight from about 300 to about 1000.

The reaction of the intermediate product A with the one or more polyalkylene glycols suitably takes place at a temperature of from about 160 to about 300° C., preferably from about 190 to about 260° C. The optimal temperature may depend on which polyalkylene glycol that is used.

The resinous material is suitably a hydrocarbon resin or a rosin, or a mixture thereof. Suitable hydrocarbon resins include aliphatic or aromatic hydrocarbon resins derived from respectively $C_5$ feed streams and $C_9$ feed streams, DCPD resins, terpene resins, terpene/phenol resins and cumarone/indene resins. The resinous material is preferably a rosin. The rosin comprises rosin acids which are mainly a mixture of $C_{20}$ monobasic carboxylic acids containing a phenanthrene skeleton. The rosin can be an unmodified or a modified rosin. There are many different ways of modifying rosin. The rosin can be partially fortified or esterified. Preferably, the rosin is a glycerol, pentaerythritol or triethylene glycol ester of a rosin acid. The rosin can be treated with paraformaldehyde in the presence of paratoluene sulphonic acid to inhibit crystallization or it can be stabilized by disproportionation which involves transferring hydrogen atoms from one molecule of abietic acid to another. This is suitably carried out by heating rosin at from about 100° C. to about 300° C. in the presence of a disproportionation catalyst. Examples of disproportionation catalysts are: supported or non supported metals such as palladium, nickel and platinum iodine, iodides such as iron iodide, sulphur dioxide and sulphides such as iron sulphide. The catalyst is suitably employed in an amount of from about 0.1% to about 5% by weight on the basis of the amount of rosin employed. The disproportionated rosin prepared in the above manner has preferably a content of abietic acid of not more than about 5% by weight. Rosins partially saponified with sodium or potassium hydroxide or with a volatile base (e.g. ammonia or a lower amine such as triethanolamine) are also useful. The tackifier dispersion according to the invention can comprise any of the above described rosins or mixtures thereof.

When preparing the tackifier dispersion according to the invention, the resinous material is suitably first melted and the emulsifier is added, suitably as a melted substance or as present in an aqueous solution. The aqueous solution is preferred in continuous dispersing processes, while the melted substance is preferred in batch dispersing processes. The emulsifier is added so as to be present in the tackifier dispersion in an amount of suitably from about 2 to about 15% by weight, based on the weight of resinous material, preferably from about 5 to about 8% by weight. Sufficient hot water, suitably from about 5 to about 15% by weight, based on the weight of resinous material, is stirred in to form a creamy water in oil emulsion. Upon dilution with water, suitably in an amount of from about 10 to about 35% by weight, based on the weight of resinous material, preferably from about 15 to about 30% by weight, most preferably from about 20 to about 25%, the emulsion inverts to provide a stable oil in water emulsion. The dispersion is suitably further diluted with water until the desired solids content is reached. If required, conventional anionic emulsifiers (surfactants) can be incorporated into the tackifier dispersion. Such typical anionic emulsifiers include alkyl aryl sulphonates, such as sodium or ammonium alkyl benzene sulphonates, fatty alcohol sulphates, e.g. sodium lauryl sulphate, phosphate esters, e.g. sodium salts of mono- and di-esters of orthophosphoric acid, esters of sulphosuccinic acid, sodium salts of sulphated monoglycerides and sulphonates or sulphosuccinates of alkyl phenol polyoxyalkylene oxide condensates or of polyoxyalkylene oxide condensates, e.g. the ammonium salt of nonylphenol polyethylene oxide sulphonic acid.

The solids content, i.e. the dry content of resinous material and emulsifier, in the tackifier dispersion is suitably at least about 20% by weight up to the maximum content achievable, preferably at least about 50% by weight, most preferably at least about 55% by weight.

The mean particle diameter $D_{50}$ of the resinous material in the tackifier dispersion, where $D_{50}$ means the mean particle diameter for the 50 weight % fraction of the particles starting from the smallest particles, is suitably less than about 1 micron, preferably less than about 0.7 microns, more preferably less than about 0.5 microns, most preferably less than about 0.45 microns. The mean particle diameter $D_{90}$ of the resinous material in the tackifier dispersion, where $D_{90}$ means the mean particle diameter for the 90 weight % fraction of the particles starting from the smallest particles, is suitably less than about 2 microns, preferably less than about 1.5 microns, most preferably less than about 1 micron.

The viscosity of the tackifier dispersion is suitably adapted to the specific use but is suitably, measured as Brookfield (spindle 3@50 rpm) at 20° C., from about 100 to about 1200 mPa·s, preferably from about 200 to about 700 mPa·s, most preferably from about 300 to about 500 mPa·s.

The tackifier dispersion according to the invention preferably has a storage stability (shelf life) of at least about six months and will suitably demonstrate no substantial separation, coagulation or deposition. It is also preferred that the dispersion is low foaming and have good mechanical stability during pumping, transportation and mixing, as well as low foaming and good stability when formulated in an adhesive composition and during coating of the adhesive composition.

The tackifier dispersion according to the invention is suitably used as a tackifier in compositions comprising polymers, preferably in adhesive compositions.

The invention further relates to an aqueous adhesive composition comprising one or more polymers and the tackifier dispersion according to the invention. Preferably, the aqueous adhesive composition is a pressure sensitive adhesive (PSA) composition. The aqueous adhesive composition suitably comprises from about 60 to about 90 weight % of a synthetic polymer latex or natural rubber latex, and from about 10 to about 40 weight % of the tackifier dispersion. Suitable polymers in the aqueous adhesive composition are natural and synthetic rubbers such as polychloroprene rubber, styrene-butadiene rubbers, SIS block copolymers, SBS block copolymers, VAE (vinylacetate ethylene copolymers), nitrile rubbers and polyisobutylene rubbers, acrylate polymers, acrylic polymers such as acrylic esters and methacrylate polymers or mixtures thereof. Preferred polymers used in the aqueous adhesive composition according to the invention are acrylic polymers and/or acrylic ester copolymers. Other compounds known to the person skilled in the art may also be included in the aqueous adhesive composition exemplified by wetting agents, biocides, plasticisers, stabilisers, antioxidants, fillers, colouring agent and the like. The amounts of polymers/copolymers and other compounds contained in the adhesive compositions are not critical and may vary so as to give the preferred properties of the adhesive composition. The compounds can be in any physical state guided by the state of the adhesive composition such as dispersed in an aqueous phase, liquid or solid.

The invention will now be illustrated by means of the following examples, which, however, should not be interpreted as limiting the scope of the invention. Parts and percentages mean parts by weight and percentages by weight, unless otherwise specified.

EXAMPLE 1

1000 g (83 weight %) of linseed oil, having an iodine value of 178 was heated to 180° C. 200 g (17 weight %) of maleic anhydride was gradually added, the reaction mixture being kept under agitation. The reaction mixture was then heated to 200° C. which was maintained for 6 hours. The water soluble acid value (AV[ws]) was determined and if AV[ws]<2 mg KOH/g, then the specification was considered reached. If AV[ws]>2 mg KOH/g, then the reaction mixture was allowed to react for another hour after which the water soluble acid value was again checked. The procedure was repeated until the specification was reached. The final water soluble acid value (AV[ws]) was 1.03 mg KOH/g, the acid value (AV) was 85.3 mg KOH/g and the viscosity 760 mPa·s (Brookfield spindle 3@50 rpm, 20° C.)

EXAMPLE 2

220 g (16 weight %) of the reaction product of example 1 was mixed with 1200 g (84 weight %) of polyethylene glycol PEG 4000. The temperature was kept at 250° C. for 20 hours. The acid value (AV) of the reaction product was 4.6 mg KOH/g.

EXAMPLE 3

Example 1 was repeated giving a reaction product having a final water soluble acid value (AV[ws]) of 0.74 mg KOH/g and an acid value (AV) of the maleated linseed oil of 84.6 mg KOH/g. 180 g (15 weight %) of this reaction product was mixed with 252 g (21 weight %) of polyethylene glycol PEG 1500 and 768 g (64 weight %) of polyethylene glycol PEG 4000. The temperature was kept at 200° C. for 20 hours. The product had an acid value (AV) of 5.3 mg KOH/g.

EXAMPLE 4

216 g (18 weight %) of the same reaction product of linseed oil and maleic anhydride made in example 3 was mixed with 984 g (82 weight %) of butoxy polyethylene glycol (with average molecular weight of 4000 g/mol). The temperature was kept at 200° C. for 20 hours. The product had an acid value (AV) of 7.5 mg KOH/g.

EXAMPLE 5

A tackifier dispersion was made by warming 1600 g of glycerol rosin ester (softening point of 82.8 and an acid value of 13.1 mg KOH/g), in a pot to 120° C. When molten 40 g of tri-ethanol amine (TEA) was added, while stirring the rosin, followed by addition of 64 g of the reaction product of example 2 and 80 g (29 weight % aq. solution) of a conventional anionic surfactant (Rhodapex AB20 from Rhodia). 200 ml hot (90° C.) water was added to obtain the inversion followed by addition of 400 ml hot (90° C.) dilution water. The dispersion is further diluted by addition of 1100 ml cold water (30° C.) to obtain a stable dispersion. The particle size $D_{50}/D_{90}$ which means the maximum particle size for 50 and 90 weight % respectively of the particles was 0.38/0.49 microns, the viscosity 250 mPas (Brookfield spindle 3@50 rpm, 20° C.), the solids content 50.0 weight %.

EXAMPLES 6-7

Two further tackifier dispersions were made according to the same procedure as in example 5 but using the reaction products of examples 3 and 4 respectively.

Some properties of the tackifier dispersions according to examples 5-7 are summarised in table 1. A comparison is also made with a tackifier dispersion produced according to teachings of U.S. Pat No. 5,552,519.

TABLE 1

| | Solids content (weight %) | Particle size, $D_{50}/D_{90}$ (microns) | Viscosity, Brookfield [spindle 3 @ 50 rpm, 20° C.] (mPas) |
|---|---|---|---|
| Example 5 | 50.0 | 0.38/0.49 | 250 |
| Example 6 | 50.3 | 0.32/0.51 | 420 |
| Example 7 | 55.6 | 0.35/0.54 | 200 |
| Comparison | 55.2 | 0.55/0.87 | 290 |

It is concluded that tackifier dispersions according to the present invention have smaller particle sizes than a high-performance prior art dispersion. In particular, in Example 7, very high solids content is combined with small particle sizes.

Stability tests were also made, both in terms of shelf life testing, mechanical stability tests by rheometer, cone and plate setup and high speed stirring stability test. The rheometer test is made by measuring the normal force build-up in a cone and plate setup. Increase in normal force is indicative of onset of breakdown. The high speed stirring test is made by high speed stirring equipment (Hamilton Beach). The test mixture is stirred at high speed (3000 rpm) until coagulum is formed. Time of breakdown is recorded.

A foam formation test was also performed as follows: the tackifier dispersion is stirred at high speed (3000 rpm) for one minute. The foam created is measured and expressed as relative volume (%) increase compared to starting volume.

The results are summarised in table 2.

TABLE 2

| | Shelf life | Stability test (rheology, cone and plate) | Stability test (high speed mixing) | Foam formation |
|---|---|---|---|---|
| Dispersion acc. to example 5 (the invention) | >6 months | >900 s | >20 min | 50% |
| Dispersion based on alkyl phosphate emulsifier | >6 months | ~50 s | ~4 min | 120% |

It is concluded that a tackifier dispersion according to the invention has excellent storage stability, shear stability, and foaming behaviour.

EXAMPLE 8

Three adhesive compositions, each comprising between 25 and 30 weight % (by dry weight) of the tackifier dispersion prepared in example 5, were made by blending the tackifier dispersion with each of three different acrylate based polymer products respectively (Acronal® V215 from BASF, Robond™ PS7596 from Rohm&Haas Co, and Flexcryl® 1625 from Air Products). The adhesives were coated to silicone release liners and then dried at 90° C. for 3 minutes to obtain a coat weight each of 20±1 g/m², before laminating to 80 g/m² plain paper face stock and then covered with release paper. The laminates were conditioned at 50% relative humidity at room temperature (23° C.) before assessing their adhesive properties.

Three further adhesive compositions were made in the same way but using a tackifier dispersion according to the disclosure of U.S. Pat. No. 5,552,519.

The resistance to shear (FINAT test method FTM-8), loop tack (FINAT test method FTM-9) when glued on various substrates and peel 90° (FINAT test method FTM-2) were tested for 25 mm strips of the adhesive samples.

The results are summarised in table 3.

TABLE 3

| Sample | Polymer | Amount tackifier (weight %) | Resistance to shear (h) | Loop Tack steel (N) | Loop Tack hdpe (N) | Loop Tack card (N) | Peel 90° hdpe (N) | Peel 90° card (N) |
|---|---|---|---|---|---|---|---|---|
| 1 (the invention) | Acronal ® V215 | 30 | 14 | 17.0 | 12.5 | 5.4 | 5.5 | 4.0 |
| 2 (comparative) | Acronal ® V215 | 30 | 11 | 15.5 | 9.9 | 5.7 | 5.4 | 4.3 |
| 3 (the invention) | Robond ™ PS7596 | 30 | 8 | 18.7 | 14.5 | 7.4 | 6.6 | 4.1 |
| 4 (comparative) | Robond ™ PS7596 | 30 | 5 | 19.8 | 14.9 | 7.6 | 6.7 | 4.6 |
| 5 (the invention) | Flexcryl ® 1625 | 25 | 39 | — | — | — | — | — |
| 6 (comparative) | Flexcryl ® 1625 | 25 | 19 | — | — | — | — | — |

It is concluded that an adhesive composition comprising the tackifier dispersion according to the present invention has better cohesion (measured as shear stability) than an adhesive composition comprising the reference tackifier dispersion. The adhesion results (measured as Loop Tack and Peel Adhesion) are in average equivalent to the high-performing reference tackifier dispersion.

The invention claimed is:

1. A tackifier dispersion comprising:
   a resinous material;
   an emulsifier;
   wherein:
      the resinous material is a hydrocarbon resin or a rosin, or a mixture of any two or more thereof;
      the emulsifier comprises a reaction product of an intermediate product A with one or more polyalkylene glycols, said intermediate product A being a reaction product of an ester of one or more fatty acids containing at least two conjugated double bonds and a dienophile containing an acid or anhydride group;
      the one or more polyalkylene glycols have a number average molecular weight from 3000 to 8000; and
      the emulsifier has a number average molecular weight of about 4000 to about 12,000.

2. The tackifier of claim 1, wherein a weight ratio of intermediate product A to the one or more polyalkylene glycols, based on total amount of the intermediate product A and the one or more polyalkylene glycols, is from about 0.05:1 to about 5:1.

3. The tackifier of claim 1, wherein a weight ratio of the ester of one or more fatty acids to the dienophile is less than about 25:1.

4. The tackifier of claim 1, wherein a weight ratio of the ester of one or more fatty acids to the dienophile is from about 1:1 to about 8:1.

5. The tackifier of claim 1, wherein the ester of one or more fatty acids has an iodine number of more than about 60.

6. The tackifier of claim 1, wherein the ester of one or more fatty acids is a triglyceride of one or more fatty acids.

7. The tackifier of claim 6, wherein the triglyceride is linseed oil, soybean oil or sunflower oil.

8. The tackifier of claim 1, wherein the dienophile is an alpha-beta ethylenically unsaturated carboxylic acid or anhydride.

9. The tackifier of claim 8, wherein the dienophile is maleic acid, maleic anhydride or fumaric acid.

10. The tackifier of claim 1, wherein the one or more polyalkylene glycols are $C_2$-$C_5$ polyalkylene glycols or $C_2$-$C_5$ polyalkylene glycol mono alkyl ethers.

11. The tackifier of claim 1, wherein the one or more polyalkylene glycols are a mixture of a polyalkylene glycol having an average molecular weight, determined by hydroxyl number analysis, from about 500 to about 2500, with a polyalkylene glycol having an average molecular weight from 3000 to 5000.

12. The tackifier of claim 1, wherein at least one of the one or more polyalkylene glycols is a polyethylene glycol.

13. The tackifier of claim 1, wherein at least one of the one or more polyalkylene glycols is a methoxy polyethylene glycol or a butoxy polyethylene glycol.

14. The tackifier of claim 1, wherein the emulsifier has an iodine number from about 0 to about 20 g iodine per 100 g of emulsifier.

15. The tackifier of claim 1, wherein the resinous material is a hydrocarbon resin.

16. The tackifier of claim 1, wherein the resinous material is a rosin.

17. The tackifier of claim 1, wherein the emulsifier is present in an amount from about 5 to about 8% by weight, based on the weight of resinous material.

18. The tackifier of claim 1, having a solids content of at least 50% by weight.

19. An emulsifier comprising:
   a reaction product of an intermediate product A with one or more polyalkylene glycols, said intermediate product A being a reaction product of an ester of one or more fatty acids containing at least two conjugated double bonds and a dienophile, the dienophile comprising an acid or anhydride group;
   wherein:
      the one or more polyalkylene glycols have a number average molecular weight from 3000 to 8000; and wherein:
the emulsifier has a number average molecular weight of about 4000 to about 12,000.

20. The emulsifier of claim 19, wherein a weight ratio the intermediate product A to the one or more polyalkylene glycols, based on total amount of the intermediate product A and the one or more polyalkylene glycols, is from about 0.05:1 to about 5:1.

21. The emulsifier of claim 19, wherein a weight ratio of the ester of one or more fatty acids to the dienophile is less than about 25:1.

22. The emulsifier of claim 19, wherein a weight ratio of the ester of one or more fatty acids to the dienophile is from about 1:1 to about 8:1.

23. The emulsifier of claim 19, wherein the ester of one or more fatty acids has an iodine number of more than about 60.

24. The emulsifier of claim 19, wherein the ester of one or more fatty acids is a triglyceride of one or more fatty acids.

25. The emulsifier of claim 24, wherein the triglyceride is linseed oil, soybean oil or sunflower oil.

26. The emulsifier of claim 19, wherein the dienophile is an alpha-beta ethylenically unsaturated carboxylic acid or anhydride.

27. The emulsifier of claim 19, wherein the dienophile is maleic acid, maleic anhydride or fumaric acid.

28. The emulsifier of claim 19, wherein the one or more polyalkylene glycols are $C_2$-$C_5$ polyalkylene glycols or $C_2$-$C_5$ polyalkylene glycol mono alkyl ethers.

29. The emulsifier of claim 19, wherein the one or more polyalkylene glycols are a mixture of a polyalkylene glycol having an average molecular weight, determined by hydroxyl number analysis, from about 500 to about 2500, with a polyalkylene glycol having a number average molecular weight from 3000 to 5000.

30. The emulsifier of claim 19, wherein at least one of the one or more polyalkylene glycols is a polyethylene glycol.

31. The emulsifier of claim 19, wherein at least one of the one or more polyalkylene glycols is a methoxy polyethylene glycol or a butoxy polyethylene glycol.

32. The emulsifier of claim 19, wherein the emulsifier has an iodine number from about 0 to about 20 g iodine per 100 g of emulsifier.

33. A process for the production of a tackifier dispersion, the process comprising:
dispersing a resinous material in an aqueous phase in the presence of an emulsifier;
wherein:
the resinous material is a hydrocarbon resin or a rosin, or a mixture of any two or more thereof;
the emulsifier being obtainable by a method comprising:
providing an ester of one or more fatty acids containing at least two conjugated double bonds;
reacting the ester of one or more fatty acids with a dienophile containing an acid or anhydride group to form an intermediate product A; and
reacting the intermediate product A with one or more polyalkylene glycols;
wherein:
the one or more polyalkylene glycols have a number average molecular weight of 3000 to 8000; and
the emulsifier has a number average molecular weight of about 4000 to about 12,000.

34. The process of claim 33, wherein a weight ratio the intermediate product A to the one or more polyalkylene glycols, based on total amount of the intermediate product A and the one or more polyalkylene glycols, is from about 0.05:1 to about 5:1.

35. The process of claim 33, wherein a weight ratio of the ester of one or more fatty acids to the dienophile is from about 1:1 to about 8:1.

36. A process for the production of an emulsifier, the process comprising:
providing an ester of one or more fatty acids containing at least two conjugated double bonds;
reacting the ester with a dienophile containing an acid or anhydride group to form an intermediate product A;
reacting the intermediate product A with one or more polyalkylene glycols having a number average molecular weight of more than 3000; and
wherein:
the emulsifier has a number average molecular weight of about 4000 to about 12,000.

37. The process of claim 36, wherein a weight ratio intermediate product A to one or more polyalkylene glycols, based on total amount of the intermediate product A and the one or more polyalkylene glycols, is from about 0.05:1 to about 5:1.

38. The process of claim 36, wherein a weight ratio of the ester of one or more fatty acids to the dienophile is from about 1:1 to about 8:1.

39. A composition comprising:
one or more polymers; and
a tackifier dispersion;
wherein:
said tackifier dispersion comprises:
a resinous material; and
an emulsifier comprising a reaction product of an intermediate product A with one or more polyalkylene glycols;
the resinous material is a hydrocarbon resin or a rosin, or a mixture of any two or more thereof;
said intermediate product A comprising:
a reaction product of an ester of one or more fatty acids containing at least two conjugated double bonds; and
a dienophile containing an acid or anhydride group;
the one or more polyalkylene glycols have a number average molecular weight of 3000 to 8000; and
the emulsifier has a number average molecular weight of about 4000 to about 12,000.

40. The tackifier of claim 1, wherein the one or more polyalkylene glycols have an average molecular weight from 3500 to 4500.

41. The emulsifier of claim 19, wherein the one or more polyalkylene glycols have an average molecular weight from 3500 to 4500.

42. The process of claim 33, wherein the one or more polyalkylene glycols have an average molecular weight from 3500 to 4500.

43. The composition of claim 39, wherein the one or more polyalkylene glycols have an average molecular weight from 3500 to 4500.

* * * * *